(12) United States Patent
Tan et al.

(10) Patent No.: US 11,268,494 B2
(45) Date of Patent: Mar. 8, 2022

(54) WIND TURBINE AND METHOD FOR CONTROLLING WIND TURBINE

(71) Applicant: General Electric Company, Schenectady, NY (US)

(72) Inventors: Zhuohui Tan, Shanghai (CN); Bo Qu, Shanghai (CN); Xiongzhe Huang, Shanghai (CN); Xu Fu, Shanghai (CN); Shuang Gu, Shanghai (CN); Fernando Javier D'Amato, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 16/334,622

(22) PCT Filed: Sep. 19, 2016

(86) PCT No.: PCT/CN2016/099315
§ 371 (c)(1),
(2) Date: Mar. 19, 2019

(87) PCT Pub. No.: WO2018/049676
PCT Pub. Date: Mar. 22, 2018

(65) Prior Publication Data
US 2021/0285418 A1 Sep. 16, 2021

(51) Int. Cl.
*F03D 7/02* (2006.01)
*F03D 9/25* (2016.01)
*F03D 7/04* (2006.01)

(52) U.S. Cl.
CPC ......... *F03D 7/0284* (2013.01); *F03D 7/0276* (2013.01); *F03D 7/045* (2013.01);
(Continued)

(58) Field of Classification Search
CPC ...... F03D 7/045; F03D 7/0276; F03D 7/0284; F03D 9/255; F05B 2220/706;
(Continued)

(56) References Cited

U.S. PATENT DOCUMENTS

| 4,339,666 A | 7/1982 | Patrick et al. |
| 7,095,131 B2 * | 8/2006 | Mikhail ............... F03D 7/0224 290/44 |

(Continued)

FOREIGN PATENT DOCUMENTS

| CN | 101943117 A | 1/2011 |
| CN | 102062051 A | 5/2011 |

(Continued)

OTHER PUBLICATIONS

PCT ISR Corresponding to PCT/CN2016/099315 on Sep. 19, 2016.
(Continued)

*Primary Examiner* — Pedro J Cuevas
(74) *Attorney, Agent, or Firm* — Dority & Manning, P.A.

(57) ABSTRACT

A wind turbine is provided. The wind turbine includes a mechanical system, an electrical system and a controller. The controller is for determining an electrical capability limit of the electrical system according at least in part to one or more operating conditions of the wind turbine and one or more environment conditions of a site of the wind turbine, comparing the electrical capability limit of the electrical system and a mechanical capability limit of the mechanical system, and controlling the electrical system to operate at the smaller one of the electrical capability limit and the mechanical capability limit. A method for controlling a wind turbine comprising a mechanical system and an electrical system is also provided.

20 Claims, 5 Drawing Sheets

(52) U.S. Cl.
CPC ........ *F03D 9/255* (2017.02); *F05B 2220/706* (2013.01); *F05B 2270/101* (2013.01); *F05B 2270/1032* (2013.01); *F05B 2270/32* (2013.01); *F05B 2270/325* (2013.01); *F05B 2270/327* (2013.01); *F05B 2270/332* (2013.01); *F05B 2270/335* (2013.01); *F05B 2270/337* (2013.01)

(58) Field of Classification Search
CPC .......... F05B 2270/325; F05B 2270/332; F05B 2270/1032; F05B 2270/32; F05B 2270/101; F05B 2270/335; F05B 2270/337; F05B 2270/327
USPC ..................................................... 290/44, 55
See application file for complete search history.

(56) References Cited

U.S. PATENT DOCUMENTS

| | | | |
|---|---|---|---|
| 7,615,880 B2 * | 11/2009 | Kikuchi | H02P 9/006 290/44 |
| 7,761,190 B2 | 7/2010 | Delmerico et al. | |
| 7,763,989 B2 | 7/2010 | Kinzie et al. | |
| 7,855,469 B2 | 12/2010 | Stegemann et al. | |
| 7,952,216 B2 * | 5/2011 | Kikuchi | F03D 7/042 290/44 |
| 8,022,565 B2 | 9/2011 | Scholte-Wassink et al. | |
| 8,242,620 B2 * | 8/2012 | Kikuchi | F03D 9/25 290/44 |
| 8,466,573 B2 * | 6/2013 | Kikuchi | F03D 7/042 290/44 |
| 8,478,449 B2 | 7/2013 | Hernandez Mascarell | |
| 8,659,178 B2 | 2/2014 | Arlaban Gabeiras et al. | |
| 8,928,165 B2 * | 1/2015 | Vasak | H02P 29/0243 290/44 |
| 9,018,784 B2 | 4/2015 | Laborda Rubio et al. | |
| 9,018,787 B2 | 4/2015 | Dange et al. | |
| 9,163,610 B2 | 10/2015 | Quottrup | |
| 10,197,986 B2 * | 2/2019 | Tazawa | H02P 23/0004 |
| 10,579,038 B2 * | 3/2020 | Tazawa | H02P 23/0004 |
| 2008/0042442 A1 | 2/2008 | Richter et al. | |
| 2011/0153096 A1 | 6/2011 | Pal et al. | |
| 2013/0214534 A1 | 8/2013 | Nakamura et al. | |
| 2014/0191506 A1 | 7/2014 | Oing | |
| 2014/0246855 A1 * | 9/2014 | Vasak | H02P 29/0243 290/44 |
| 2015/0021912 A1 * | 1/2015 | Bech | F03D 7/0284 290/44 |

FOREIGN PATENT DOCUMENTS

| | | |
|---|---|---|
| CN | 102105682 A | 6/2011 |
| CN | 102108939 A | 6/2011 |
| CN | 104074679 A | 10/2014 |
| WO | WO2009/153614 A2 | 12/2009 |

OTHER PUBLICATIONS

Abo-Al-Ez et al., Modelling and Adaptive Control of a Wind Turbine for Smart Grid Applications, 2015 International Conference on the Industrial and Commercial Use of Energy (ICUE), Cape Town, Aug. 18-19, 2015, pp. 332-339.

Kojabadi et al., Development of a novel wind turbine simulator for wind energy conversion systems using an inverter-controlled induction motor, IEEE Transactions on Energy Conversion, vol. 19, Issue 3, Sep. 2004, pp. 547-552.

EPO Search Report, dated Apr. 14, 2020.

* cited by examiner

WIND TURBINE AND METHOD FOR CONTROLLING WIND TURBINE

BACKGROUND

Embodiments of the invention relate to a wind turbine and a method for controlling the wind turbine.

Wind turbines convert wind energy to electrical energy and transmit the electrical energy to a power system. A wind turbine includes a mechanical system, an electrical system and a control system. The control system includes a turbine controller for controlling the mechanical system and a converter controller for controlling the electrical system, for example a generator and a converter. During operation, the turbine controller sends commands, for example a torque or power command to the converter controller, and the converter controller follows the command to control the electrical system to deliver electrical power to the power system (for example, a power grid). However, the turbine controller does not have detailed and dynamic information of the electrical system, e.g. maximum active power that can be delivered via the electrical system. Hence, on one hand, the turbine controller usually uses conservative fixed limits of the electrical system to control the wind turbine. Further the limits used in the turbine controller usually keep large margins from physical limits of the electrical systems. On the other hand, the capability of the electrical system varies as grid and environment conditions change, for example grid voltage increases or ambient temperature drops, in turn the electrical margins described above also change. There are opportunities to better manage these dynamic margins to increase the turbine output power when the mechanical system also has capability to capture more wind energy. That is, as grid and environment change, the wind turbine can dynamically boost its power output instead of following a fixed or pre-determined power curve.

It is desirable to provide a wind turbine and a method to address at least one of the above-mentioned problems.

BRIEF DESCRIPTION

In accordance with one embodiment disclosed herein, a wind turbine is provided. The wind turbine includes a mechanical system, an electrical system and a controller. The controller is for determining an electrical capability limit of the electrical system according at least in part to one or more operating conditions of the wind turbine and one or more environment conditions of a site of the wind turbine, comparing the electrical capability limit of the electrical system and a mechanical capability limit of the mechanical system, and controlling the electrical system to operate at the smaller one of the electrical capability limit and the mechanical capability limit.

In accordance with another embodiment disclosed herein, a method for controlling a wind turbine comprising a mechanical system and an electrical system is provided. The method includes determining an electrical capability limit of the electrical system according at least in part to one or more operating conditions of the wind turbine and one or more environment conditions of a site of the wind turbine; comparing the electrical capability limit of the electrical system and a mechanical capability limit of the mechanical system; and controlling the electrical system to operate at the smaller one of the electrical capability limit and the mechanical capability limit.

DRAWINGS

These and other features and aspects of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "first", "second" and the like in the description and the claims do not mean any sequential order, number or importance, but are only used for distinguishing different components.

Figure 1:
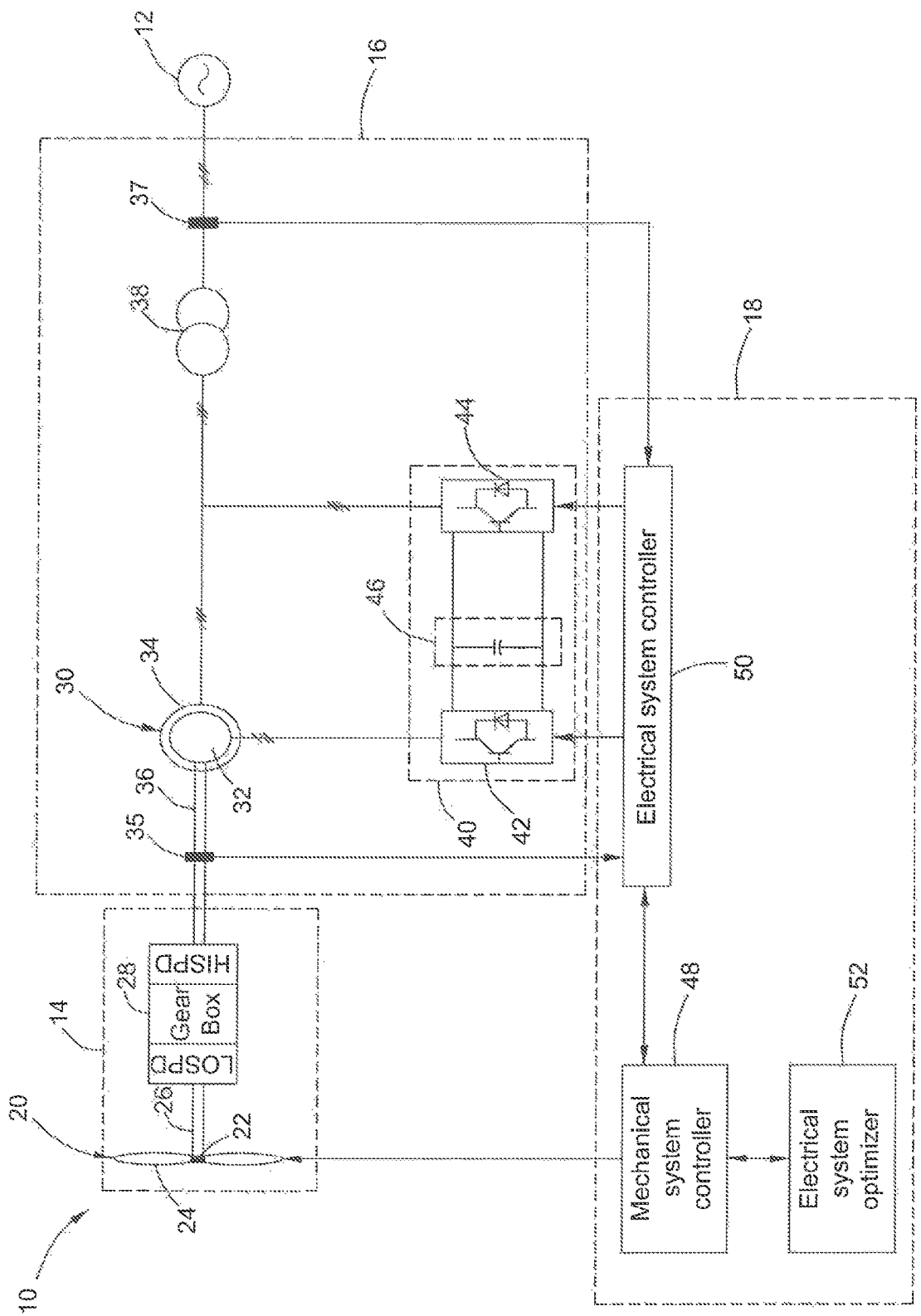
FIG. 1 is a schematic diagram of a wind turbine for delivering electrical power to a power grid in accordance with an embodiment.

FIG. 1 illustrates a schematic diagram of a wind turbine 10 for delivering electrical power to a power grid 12 in accordance with an embodiment. The wind turbine 10 described and shown herein is a wind turbine generator for generating electrical power from wind energy. The wind turbine 10 includes a mechanical system 14, an electrical system 16 and a controller 18. The mechanical system 14 transforms the wind energy into a rotational torque or force that drives one or more generators of the electrical system 16 that may be rotationally coupled to a rotor 20 through a gearbox 28. The electrical system 16 transforms the rotational torque or force from the mechanical system 14 into the electrical power for the power grid 12. The controller 18 controls the mechanical system 14 and the electrical system 16.

The mechanical system 14 includes the rotor 20 including a hub 22 and multiple blades 24 (sometimes referred to as "airfoils") extending radially outwardly from the hub 22 for converting the wind energy into rotational energy. The rotor 20 may generally face upwind to harness the wind energy, and/or the rotor 20 may generally face downwind to harness the wind energy. Of course, in any embodiments, the rotor 20 may not face exactly upwind and/or downwind, but may face generally at any angle (which may be variable) with respect to a direction of the wind to harness energy therefrom. The rotor 20 includes a rotor shaft 26 coupled to the rotor hub 22 for rotation therewith. In an embodiment, the mechanical system 14 includes the gearbox 28 coupled with the rotor shaft 26, which steps up the inherently low rotational speed of the rotor 20 for the generator 30 to efficiently convert the mechanical energy to the electrical energy. In other embodiments, the gearbox 28 may be omitted. In an embodiment, the mechanical system 14 may include other components not shown in FIG. 1, such as a nacelle, a tower.

The electrical system 16 includes a generator 30 coupled to the rotor 20 for generating electrical power from the rotational energy generated by the rotor 20. The generator 30 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator.

The generator 30 includes a generator rotor 32 and a generator stator 34 with an air gap included therebetween. The generator 30 is coupled to the rotor shaft 26 such that rotation of the rotor shaft 26 drives rotation of the generator rotor 32, and therefore operation of the generator 30. In an embodiment, the generator rotor 32 has a generator shaft 36 coupled thereto and coupled to the rotor shaft 26 such that rotation of the rotor shaft 26 drives rotation of the generator rotor 32. In the illustrated embodiment, the generator shaft 36 is coupled to the rotor shaft 26 through the gearbox 28. In another embodiment, the generator rotor 32 is directly coupled to the rotor shaft 26, sometimes referred to as a "direct-drive wind turbine." Torque of the rotor 20 drives the generator rotor 32 to thereby generate variable frequency alternating current (AC) electrical power from rotation of the rotor 20. The generator stator 34 is coupled to the power grid 12 through a transformer 38.

The electrical system 16 includes a converter unit 40 coupled to the generator 30 for converting the variable frequency AC to a fixed frequency AC for delivery to the power grid 12. In an embodiment, the converter unit 40 may include a single phase converter or a multi-phase converter configured to convert electricity generated by the generator 30 to electricity suitable for delivery over the power grid 12. In the illustrated embodiment, the converter unit 40 may include a rotor-side converter 42, a line-side converter 44 and a direct current (DC) link 46. The DC link 46 connects the rotor-side converter 42 and the line-side converter 44. The rotor-side converter 42 is configured to convert the AC power from the generator rotor 32 of the generator 30 into DC power. The line-side converter 44 is configured to convert the DC power to AC power at a frequency compatible with the grid 12.

The rotor-side converter 42 may include an AC-DC converter which converts an AC voltage from the generator 30 to a DC voltage on the DC link 46. The DC link 46 may include one or more capacitors coupled either in series or parallel for maintaining the DC voltage of the DC link 46 at a certain level, and thus the energy flow from the DC link 46 to the grid 12 can be managed. The line-side converter 44 may include a DC-AC inverter which converts the DC voltage on the DC link 46 to AC voltage with suitable frequency, phase, and magnitude for feeding to the power grid 12. In another embodiment, the converter unit 40 may include one AC-AC converter.

The transformer 38 is configured to provide voltage or current transformation of the power from the converter unit 40 and the power from the generator stator 34. The transformer 38 is configured to step up the magnitude of the AC voltages output from the line-side converter 44 and the generator stator 34 to match the power grid 12. The electrical system 16 in the illustrated embodiment is only a non-limited example, but in some other embodiments the electrical system 16 may include one or more other elements or have other connections between elements.

The controller 18 is for determining an electrical capability limit of the electrical system 16 according at least in part to one or more operating conditions of the wind turbine 10 and one or more environment conditions of a site of the wind turbine 10, comparing the electrical capability limit of the electrical system 16 and a mechanical capability limit of the mechanical system 14, and controlling the electrical system 16 to operate at the smaller one of the electrical capability limit and the mechanical capability limit. The term "electrical capability limit" refers to maximum operating parameter(s) the electrical system 16 can operate at under the current operating conditions thereof and the current environment conditions, which is dynamic. The electrical capability limit includes at least one of a torque limit and a rotational speed limit of the generator 30. The term "mechanical capability limit" refers to maximum operating parameter(s) the mechanical system 14 can provide to the electrical system 16, which may be pre-determined and fixed in a non-limited example. The mechanical capability limit includes at least one of a torque limit and a rotational speed limit provided by the mechanical system 14.

The controller 18 includes a mechanical system controller 48, an electrical system controller 50 and an electrical system optimizer 52. The mechanical system controller 48 is configured to control the mechanical system 14. The mechanical system controller 48 is for controlling (e.g., changing) pitch angles of the blades 24 with respect to a wind direction. The mechanical system controller 48 may control pitch actuators (not shown) coupled to the hub 22 and the blades 24 to change the pitch angle of the blades 24 by rotating the blades 24 with respect to the hub 22. The pitch actuators may include any suitable structure, configuration, arrangement, means, and/or components, whether described and/or shown herein, such as, but not limited to, electrical motors, hydraulic cylinders, springs, and/or servomechanisms. Moreover, the pitch actuators may be driven by any suitable means, whether described and/or shown herein, such as, but not limited to, hydraulic fluid, electrical power, electro-chemical power, and/or mechanical power, such as, but not limited to, spring force.

The mechanical system controller 48 is programmed to generate command signals to the electrical system controller 50 through implementation of analog circuitry and/or digital control algorithms based at least in part on wind speed of wind, current torque of the generator 30, current rotational speed of the generator 30, and the electrical capability limit of the electrical system 16 from the electrical system optimizer 52.

The electrical system controller 50 is configured to control the electrical system 16. In an embodiment, the electrical system controller 50 is configured to control operations of the converter unit 40 through implementation of analog circuitry and/or digital control algorithms in response to the command signals from the mechanical system controller 48. The electrical system controller 50 monitors operation of the electrical system 16. For example, the electrical system controller 50 monitors the current torque and the current rotational speed of the generator 30 via sensors 35 at the generator shaft 36, and monitors a grid voltage of the power grid 12 through a sensor 37, but it is not limited.

The electrical system optimizer 52 is for determining the electrical capability limit of the electrical system 16 and providing the electrical capability limit to the mechanical system controller 48. The mechanical system controller 48 is for comparing the electrical capability limit of the electrical system 16 and the mechanical capability limit of the mechanical system 14 and provides optimized command signals based on the smaller one of the electrical capability limit and the mechanical capability limit to the electrical system controller 50. The electrical system controller 50 controls the converter unit 40 of the electrical system 16 in response to the optimized command signals from the mechanical system controller 48, so that the generator 30 operates at the smaller one of the electrical capability limit and the mechanical capability limit.

Figure 2:
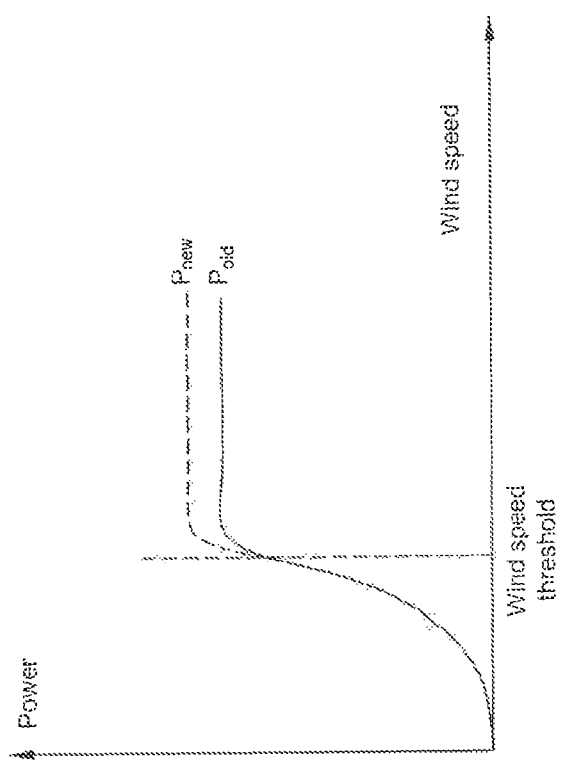
FIG. 2 is a graphical example illustrating a power curve versus wind speed in accordance with an embodiment.

With reference to FIG. 2, when the wind speed is lower than a wind speed threshold, the electrical power generated by the wind turbine 10 rises rapidly as the wind speed rises. However, when the wind speed rises higher than the wind speed threshold, the wind turbine 10 generates substantially the same electrical power due to limits of the electrical system 16 and the mechanical system 14. The wind speed threshold may be 12 m/s, for example. In the condition that the wind speed is higher than the wind speed threshold, the electrical limit of the electrical system 16 is dynamic with the operating conditions and the environment conditions, the electrical system optimizer 52 may determine a higher electrical capability limit than a traditional fixed electrical limit, and the mechanical system controller 48 may generate a higher torque command for the electrical system 16 and a higher rotational speed command for the mechanical system 14 under the mechanical capability limit of the mechanical system 14, so the torque of the generator 30 is boosted and an electrical power $P_{new}$ generated by the wind turbine 10 in FIG. 1 is higher than an electrical power $P_{old}$ generated by the traditional wind turbine. Accordingly, annual energy production (AEP) increases.

Figure 3:
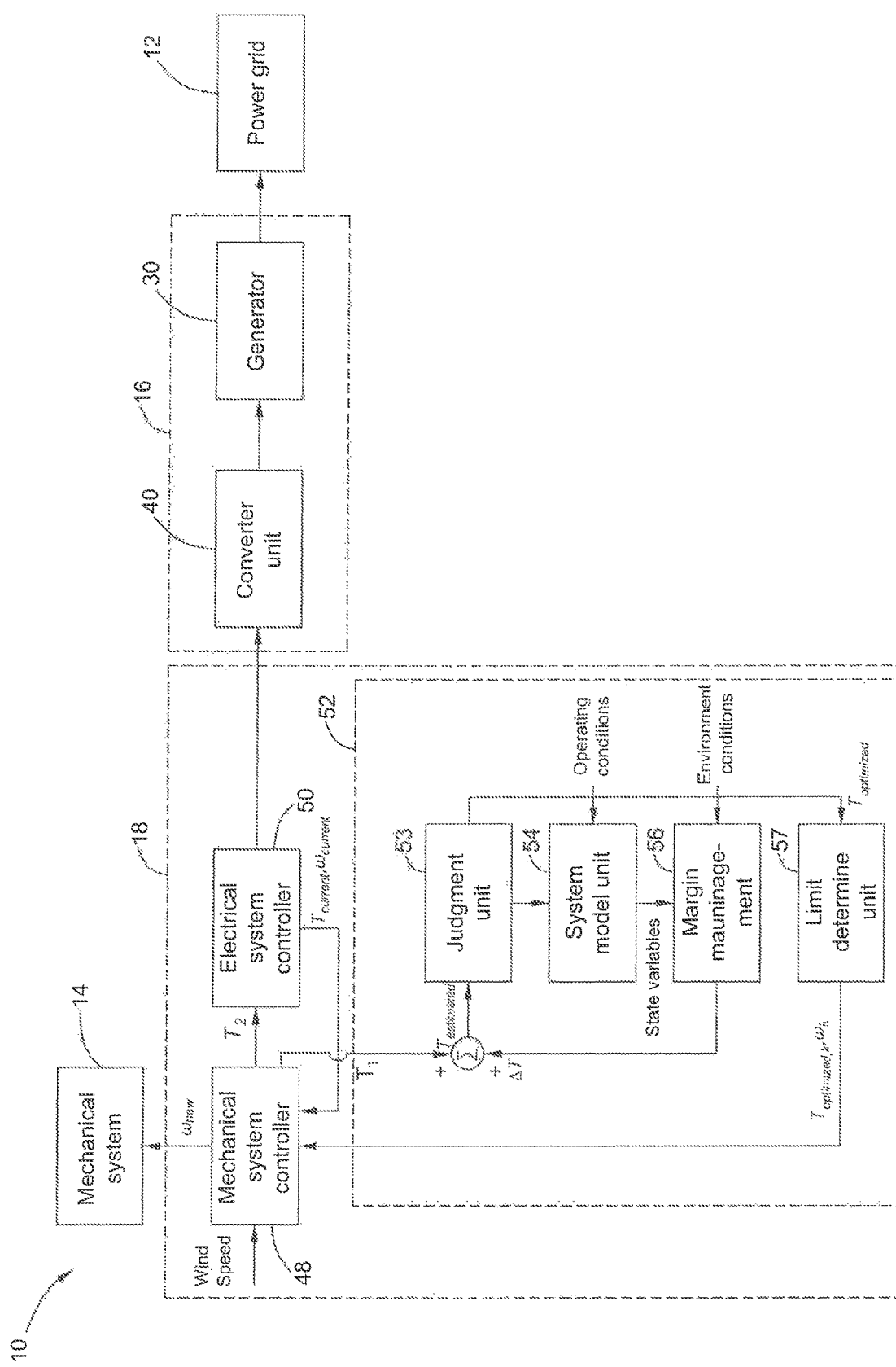
FIG. 3 is a block diagram of the wind turbine of FIG. 1 in accordance with an embodiment.

FIG. 3 illustrates a block diagram of the wind turbine 10 in accordance with an embodiment. The mechanical system controller 48 determines a first torque command $T_1$, which is an initial torque command, according to the wind speed, the current torque $T_{current}$ and the current rotational speed $\omega_{current}$ of the generator 30. The wind speed of wind may be detected by sensor(s) near the rotor 20 of the wind turbine 10. The current torque $T_{current}$ and the current rotational speed $\omega_{current}$ of the generator 30 may be provided by the electrical system controller 50.

The first torque command $T_1$ is provided to the electrical system optimizer 52. The electrical system optimizer 52 is for generating one or more state variables of the electrical system 16 according at least in part to the first torque command $T_1$ and the operating conditions of the wind turbine, determining a command margin $\Delta T$ according at least in part to the state variables and the environment conditions, and adjusting the first torque command $T_1$ using the command margin $\Delta T$ in an iteration method until at least one of the state variables substantially reaches to a corresponding state variable limit to obtain an optimized torque command $T_{optimized}$.

The electrical system optimizer 52 includes a judgment unit 53, a system model unit 54, a margin management unit 56 and a limit determine unit 57. In an embodiment, the judgment unit 53, the system model unit 54 and the margin management unit 56 of the electrical system optimizer 52 operate in loops in the iteration method to generate the optimized torque command $T_{optimized}$ at a corresponding rotational speed of the generator 30. In an embodiment, the rotational speed herein may be selected from a series of rotational speeds $[\omega_0, \omega_1, \ldots, \omega_n]$ (n is a positive integer). A series of the optimized torque commands $[T_{optimized,0}, T_{optimized,1}, \ldots, T_{optimized,n}]$ at corresponding rotational speeds $[\omega_0, \omega_1, \ldots, \omega_n]$ are generated respectively in such a method.

The judgment unit 53 judges if an estimated command $T_{estimated}$ is the optimized command $T_{optimized}$, where the estimated command $T_{estimated}$ is a sum of the command margin $\Delta T$ determined by the margin management unit 56 and the first torque command $T_1$. In a first loop of the iteration method, the initial command margin $\Delta T$ can be set zero, so the estimated command $T_{estimated}$ is equal to the first torque command $T_1$. If the estimated command $T_{estimated}$ is the optimized command $T_{optimized}$, the estimated command $T_{estimated}$ is provided to the limit determine unit 57 as the optimized command $T_{optimized}$, otherwise the estimated command $T_{estimated}$ is provided to the system model unit 54 to enter into the next loop.

The system model unit 54 is for generating the state variables of the wind turbine 10 according to the estimated command $T_{estimated}$ and one or more operating conditions of the wind turbine 10. The system model unit 54 may include at least one of a converter control model of the electrical system controller 50, an electrical model of the electrical system 16 and a thermal model of the electrical system 16, and generate the state variables based on at least one model thereof.

In an embodiment, the system model unit 54 includes the converter control model and the electrical models of the converter unit 40 and the generator 30. The operating conditions of the wind turbine 10 includes at least one of the grid voltage of the power grid 12, the series of rotational speeds $[\omega_0, \omega_1, \ldots, \omega_n]$ of the generator 30, and a power factor of the generator 30. The state variables may be the electrical state variables including at least one of currents of the generator 30, currents of the converter unit 40 and voltages of the generator 30 in an embodiment.

In another embodiment, the system model unit 54 includes the thermal model of the electrical system 16 which may include a thermal model of the generator 30, a thermal model of cables of the electrical system 16 and any other thermal models of electrical components, such as reactor, fuse, bridge circuit. The system model unit 54 generates the state variables according to the first torque command $T_1$ and the operating conditions based on the thermal model of the electrical system 16. The state variables may include thermal state variables indicating component temperatures at the operating conditions. In another embodiment, the system model unit 54 may include one or more other models of the electrical system 16.

The state variables from the system model unit 54 is provided to the margin management unit 56. The margin management unit 56 is for determining the command margin $\Delta T$ according at least in part to the state variables and the environment conditions. In an embodiment, the command margin $\Delta T$ is a torque margin. The command margin $\Delta T$ from the margin management unit 56 is sent back to adjust the first command $T_1$, i.e., estimate the estimated command $T_{estimated}$ which is provided to the judgment unit 53 again.

The judgment unit 53, the system model unit 54 and the margin management unit 56 operate in such loops until at least one of the state variables substantially reaches a corresponding state variable limit thereof to obtain the optimized torque command $T_{optimized}$ in such iteration method. And the series of the optimized torque commands $[T_{optimized,0}, T_{optimized,1}, \ldots, T_{optimized,n}]$ corresponding to the series of rotational speeds $[\omega_0, \omega_1, \ldots, \omega_n]$ are generated.

The limit determine unit 57 may store the optimized torque commands $[T_{optimized,0}, T_{optimized,1}, \ldots, T_{optimized,n}]$ and the corresponding rotational speeds $[\omega_0, \omega_1, \ldots, \omega_n]$ in a table. The limit determine unit 57 estimates a series of powers $[P_0, P_1, \ldots, P_n]$ from the optimized torque commands $[T_{optimized,0}, T_{optimized,1}, \ldots, T_{optimized,n}]$ and the corresponding rotational speeds $[\omega_0, \omega_1, \ldots, \omega_n]$, and determines the maximum power $P_k$ (k is an integer from 0 to n) from the powers $[P_0, P_1, \ldots, P_n]$. The maximum power $P_k$ is a power limit of the electrical capability limit. The limit determine unit 57 determines the optimized torque command which is the torque limit $T_{optimized,k}$ and the optimized rotational speed command which is the rotational speed limit $\omega_k$ to the mechanical system controller 48. The torque limit $T_{optimized,k}$ and the corresponding rotational speed limit $\omega_k$ are the electrical capability limit of the electrical system 16 in an embodiment.

The mechanical system controller 48 generates a second torque command $T_2$ according to the electrical capability limit which is the torque limit $T_{optimized,k}$ herein and the first torque command $T_1$ to the electrical system controller 50. And the mechanical system controller 48 also generates a new rotational speed command $\omega_{new}$ according to the electrical capability limit which is the rotational speed limit $\omega_k$ herein and the mechanical capability limit to the mechanical system 14. The mechanical system controller 48 may control the mechanical system 14 to change the pitch angles of the blades 24 according to the new rotational speed command $\omega_{new}$.

The electrical system controller 50 controls the converter unit 40 according to the second torque command $T_2$. The electrical system controller 50 generates pulse-width modulation (PWM) signals under limits of currents, voltages, and/or temperatures of the electrical system 16 to the converter unit 40 according to the second torque command $T_2$ and the converter unit 40 convers voltages for the generator 30. The generator 30 and the converter unit 40 as shown in FIG. 1 both provide the electrical power to the power grid 12. In another embodiment, the generator 30 provides the electrical power to the power grid 12.

Figure 4:
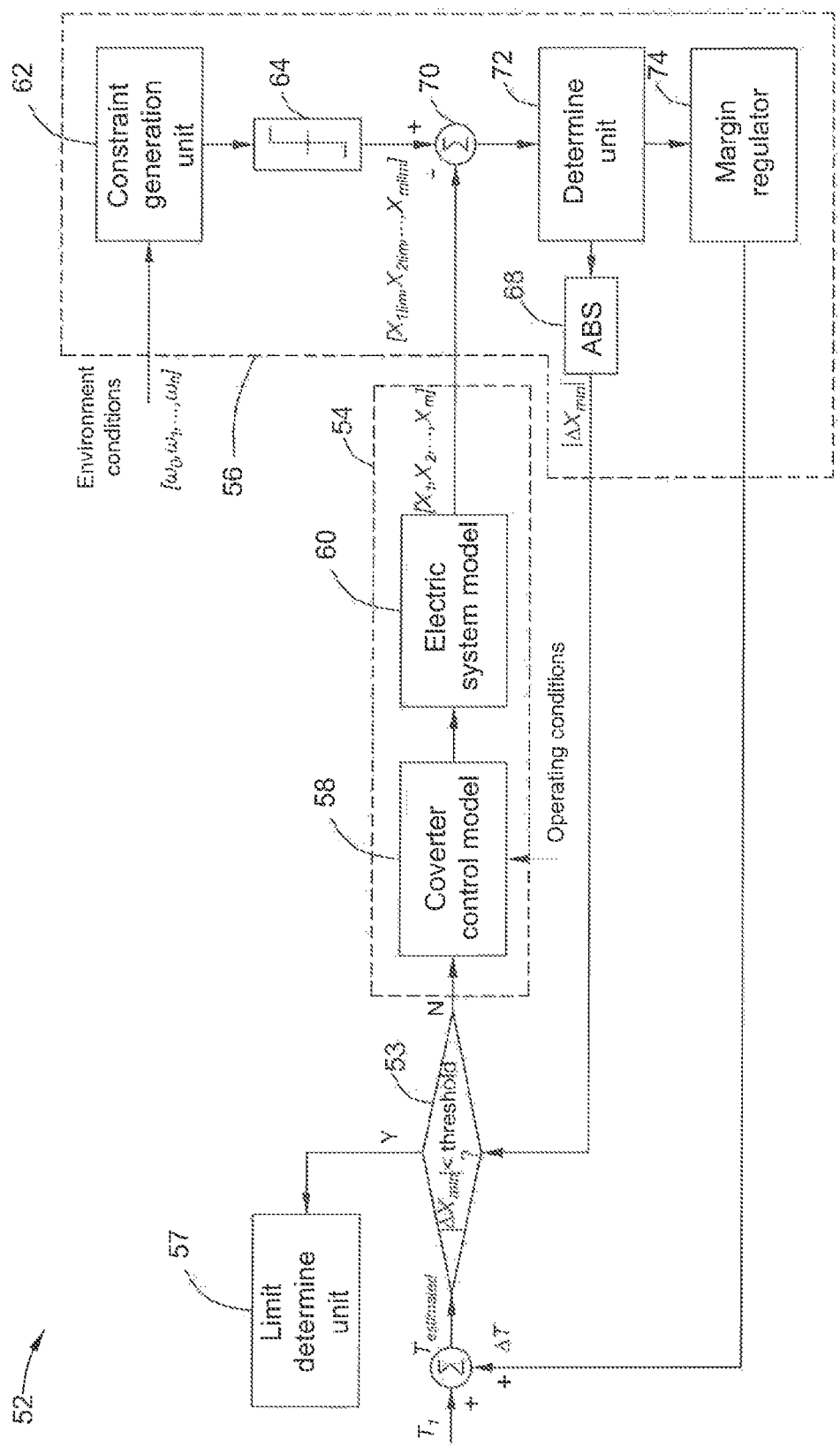
FIG. 4 is a block diagram of an electrical system optimizer of the wind turbine of FIG. 1 in accordance with an embodiment.

FIG. 4 illustrates a block diagram of the electrical system optimizer 52 in accordance with an embodiment. In the illustrated embodiment, the system module unit 54 includes the converter control model 58 and the electrical system model 60. The converter control model 58 generates converter control signals according to the operating conditions and the estimated command $T_{estimated}$ estimated from the first torque command $T_1$ and the command margin $\Delta T$. The converter control signals are provided to the electrical system model 60 for generating the state variables $[x_1, x_2, \ldots, x_m]$ (m is a positive integer) of the electrical system 16 at the operating conditions.

The margin management unit 56 includes a constraint generation unit 62 and a margin governor 64. The constraint generation unit 62 generates first limits of the state variables according to the environment conditions and the series of rotational speeds $[\omega_0, \omega_1, \ldots, \omega_n]$ under physical limits of the electrical system 16. The physical limits are maximum state variables at which the electrical system 16 can operate. For example, the first limit of a generator current cannot beyond the physical limit of the generator current, the first limit of a generator voltage cannot beyond the physical limit of the generator voltage, the first limit of heat of the electrical system 16 cannot beyond the heat that the electrical system 16 can afford.

The margin governor 64 determines margins under the first limits of the state variables to generate second limits $[x_{1lim}, x_{2lim}, \ldots, x_{mlim}]$ of the state variables to keep the margins under different conditions, for example, to keep current margins in case of transient events. The margins may be determined according to particular applications.

Differences between the second limits $[x_{1lim}, x_{2lim}, \ldots, x_{mlim}]$ and the corresponding state variables $[x_1, x_2, \ldots, x_m]$ are estimated respectively by a summator 70. The margin management unit 56 includes a determine unit 72 and a margin regulator 74. The determine unit 72 determines a minimum difference $\Delta x_{min}$ from the differences. The margin regulator 74 estimates the command margin $\Delta T$ according to the minimum difference $\Delta x_{min}$ through a PI controller. An absolute value unit 68 estimates an absolute value of the minimum difference $|\Delta x_{min}|$ from the determine unit 72. The estimated command $T_{estimated}$ is the optimized torque command $T_{optimized}$ provided to the limit determine unit 57 through the judgement unit 53 until the minimum difference $|\Delta x_{min}|$ is zero or lower than a threshold, such as 0.1, 0.2, that is to say, at least one of the state variables substantially reaches the corresponding second limit thereof.

Figure 5:
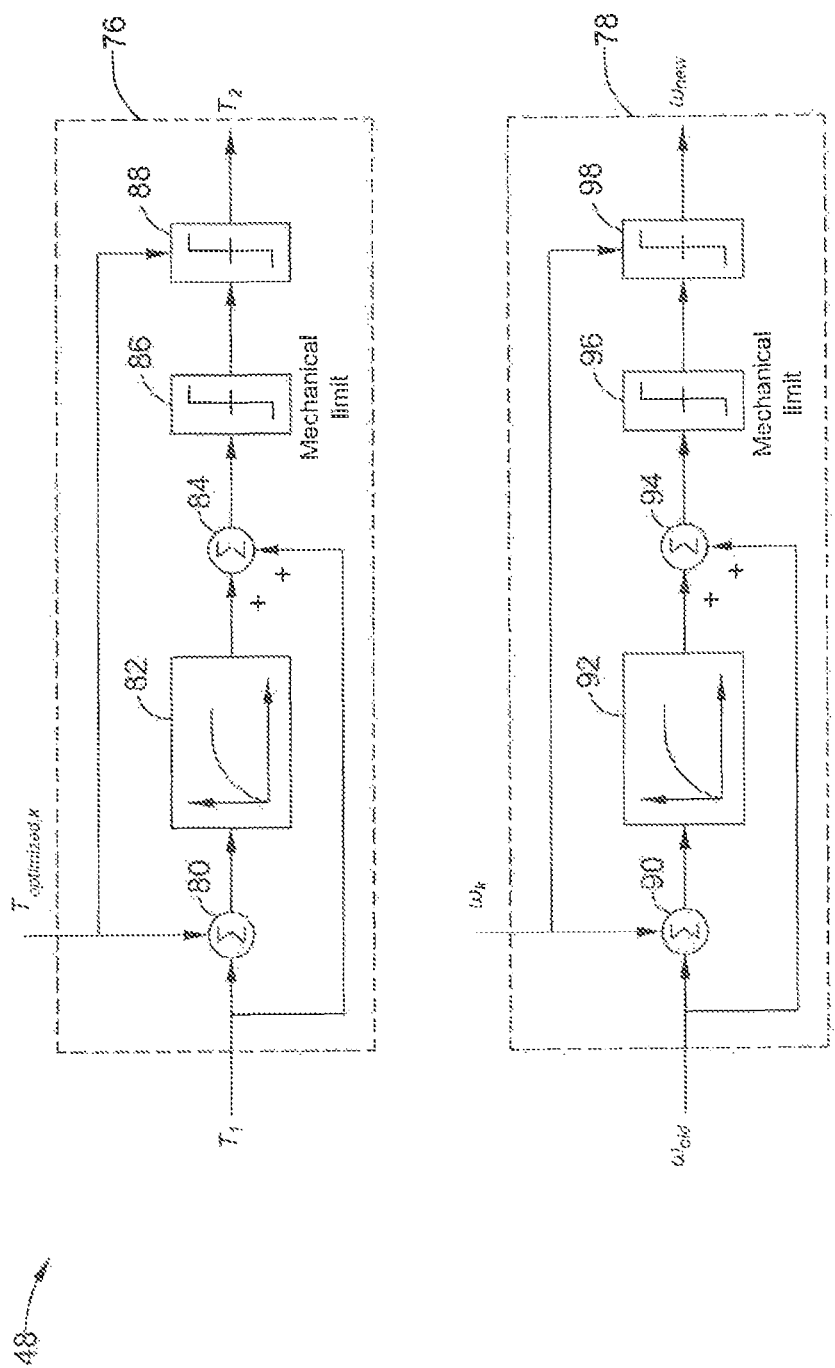
FIG. 5 is a block diagram of a mechanical system controller of the wind turbine of FIG. 1 in accordance with an embodiment.

FIG. 5 illustrates a block diagram of the mechanical system controller 48 in accordance with an embodiment. The mechanical system controller 48 includes a torque determine unit 76 and a speed determine unit 78. The torque determine unit 76 is for determining the second torque command $T_2$ for the electrical system controller 50 according to the first torque command $T_1$ and the torque limit $T_{optimized,k}$. The torque determine unit 76 includes a summator 80 for calculating a deference between the first torque command $T_1$ and the optimized torque command $T_{optimized}$ and a filter 82 for filtering the difference from the summator 80. The torque determine unit 76 includes a summator 84 for calculating a sum of the filtered difference from the filter 82 and the first torque command $T_1$. The torque determine unit 76 includes a first limit unit 86 for limiting the sum from the summator 84 under the mechanical limit and a second limit unit 88 for limiting the sum from the summator 84 under the torque command limit $T_{optimized,k}$ so as to obtain the second torque command $T_2$.

The speed determine unit 78 is for determining the new rotational speed command $\omega_{new}$ according to an old rotational speed command $\omega_{old}$ and the rotational speed limit $\omega_k$ corresponding to the torque limit $T_{optimized,k}$. The speed determine unit 78 includes a summator 90 for calculating a deference between the old rotational speed command $\omega_{old}$ and the rotational speed limit $\omega_k$ and a filter 92 for filtering the difference from the summator 90. The speed determine unit 78 includes a summator 94 for calculating a sum of the filtered difference from the filter 92 and the old rotational speed command $\omega_{old}$. The speed determine unit 78 includes a third limit unit 96 for limiting the sum from the summator 94 under the mechanical limit and a forth limit unit 98 for limiting the sum from the third limit unit 96 under the rotational speed limit $\omega_k$ so as to obtain the new rotational speed command $\omega_{new}$. The mechanical system controller 48 controls the rotor 20 according to the new rotational speed command $\omega_{new}$.

While embodiments of the invention have been described herein, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A wind turbine, comprising:
   a mechanical system;
   an electrical system; and
   a controller for,
      determining an electrical capability limit of the electrical system according at least in part to one or more operating conditions of the wind turbine and one or more environment conditions of a site of the wind turbine,
      comparing the electrical capability limit of the electrical system and a mechanical capability limit of the mechanical system, and
      controlling the electrical system to operate at the smaller one of the electrical capability limit and the mechanical capability limit.

2. The wind turbine of claim 1, wherein the electrical system comprises a generator, and the electrical capability limit of the electrical system comprises at least one of a torque limit and a rotational speed limit of the generator.

3. The wind turbine of claim 1, wherein the mechanical capability limit of mechanical system comprises at least one of a torque limit and a rotational speed limit provided by the mechanical system.

4. The wind turbine of claim 1, wherein the one or more operating conditions of the wind turbine comprise at least one of a grid voltage of a power grid, a rotational speed of a generator of the electrical system, and a power factor of the generator.

5. The wind turbine of claim 1, wherein the one or more environment conditions comprise at least one of an ambient temperature around the wind turbine, an altitude of the wind turbine and a wind speed of wind.

6. The wind turbine of claim 1, wherein the controller comprises,
   a mechanical system controller for determining a first torque command according at least in part to a wind speed of wind;
   an electrical system optimizer for generating the electrical capability limit of the electrical system according to the first torque command, the one or more operating conditions and the one or more environment conditions to the mechanical system controller, the mechanical system controller determining a second torque command according to the first torque command and the electrical capability limit; and
   an electrical system controller for controlling the electrical system according to the second torque command.

7. The wind turbine of claim 6, wherein the electrical system optimizer is for,
   generating one or more state variables of the electrical system according at least in part to the first torque command and the one or more operating conditions of the wind turbine,
   determining a command margin according at least in part to the one or more state variables and the one or more environment conditions, and
   adjusting the first torque command using the command margin in an iteration method until at least one of the one or more state variables substantially reaches to a corresponding state variable limit to obtain an optimized torque command.

8. The wind turbine of claim 7, wherein the electrical system optimizer is for determining a series of the optimized torque commands corresponding to a series of rotational speeds of a generator of the electrical system.

9. The wind turbine of claim 8, wherein the electrical system optimizer is for estimating a series of powers from the optimized torque commands and the rotational speeds, determining a maximum power from the series of powers, and determining the optimized torque command and the rotational speed corresponding to the maximum power to obtain a torque limit and a rotational speed limit of the electrical capability limit.

10. The wind turbine of claim 7, wherein the one or more state variables comprise at least one of a stator current and a rotor current of a generator of the electrical system.

11. A method for controlling a wind turbine comprising a mechanical system and an electrical system, comprising:
    determining an electrical capability limit of the electrical system according at least in part to one or more operating conditions of the wind turbine and one or more environment conditions of a site of the wind turbine;
    comparing the electrical capability limit of the electrical system and a mechanical capability limit of the mechanical system; and
    controlling the electrical system to operate at the smaller one of the electrical capability limit and the mechanical capability limit.

12. The method of claim 11, wherein the electrical capability limit of the electrical system comprises at least one of a torque and a rotational speed of a generator of the electrical system.

13. The method of claim 11, wherein the mechanical capability limit of mechanical system comprises at least one of a torque limit and a rotational speed limit provided by the mechanical system.

14. The method of claim 11, wherein the one or more operating conditions of the wind turbine comprise at least one of a grid voltage of a power grid, a rotational speed of a generator of the electrical system, and a power factor of the generator.

15. The method of claim 11, wherein the one or more environment conditions comprise at least one of an ambient temperature around the wind turbine, an altitude of the wind turbine and a wind speed of wind.

16. The method of claim 11, comprising,
    determining a first torque command according at least in part to a wind speed of wind;
    generating the electrical capability limit of the electrical system according to the first torque command, the one or more operating conditions and the one or more environment conditions, and
    determining a second torque command according to the first torque command and the electrical capability limit; and
    controlling the electrical system according to the second torque command.

17. The method of claim 16, wherein determining the electrical capability limit comprises,
    generating one or more state variables of the electrical system according at least in part to the first torque command and the one or more operating conditions of the wind turbine,
    determining a command margin according at least in part to the one or more state variables and the one or more environment conditions, and adjusting the first torque command using the command margin in an iteration method until at least one of the one or more state variables substantially reaches to a corresponding state variable limit to obtain an optimized torque command.

18. The method of claim 17, wherein determining the electrical capability limit comprises determining a series of the optimized torque commands corresponding to a series of rotational speeds of a generator of the electrical system.

19. The method of claim 18, wherein determining the electrical capability limit comprises,
- estimating a series of powers from the optimized torque commands and the rotational speeds,
- determining a maximum power from the series of powers, and
- determining the optimized torque command and the rotational speed corresponding to the maximum power to obtain a torque limit and a rotational speed limit of the electrical capability limit.

20. The method of claim 17, wherein the one or more state variables comprise at least one of a stator current and a rotor current of a generator of the electrical system.

\* \* \* \* \*